US010863556B2

(12) United States Patent
Lau et al.

(10) Patent No.: US 10,863,556 B2
(45) Date of Patent: Dec. 8, 2020

(54) METHOD AND SYSTEM FOR NETWORK SLICE IDENTIFICATION AND SELECTION

(71) Applicant: Verizon Patent and Licensing Inc., Arlington, VA (US)

(72) Inventors: Priscilla Lau, Concord, CA (US); Arvind Aggarwal, San Ramon, CA (US); Lalit R. Kotecha, San Ramon, CA (US); Patricia R. Chang, San Ramon, CA (US); Jin Yang, Orinda, CA (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 97 days.

(21) Appl. No.: 16/157,251

(22) Filed: Oct. 11, 2018

(65) Prior Publication Data

US 2020/0120721 A1    Apr. 16, 2020

(51) Int. Cl.
| | |
|---|---|
| *H04W 28/26* | (2009.01) |
| *H04W 48/00* | (2009.01) |
| *H04W 48/10* | (2009.01) |
| *H04W 76/10* | (2018.01) |
| *H04W 48/12* | (2009.01) |
| *H04W 28/24* | (2009.01) |
| *H04W 48/18* | (2009.01) |
| *H04W 92/04* | (2009.01) |
| *H04W 88/02* | (2009.01) |
| *H04W 92/12* | (2009.01) |

(52) U.S. Cl.
CPC .......... *H04W 76/10* (2018.02); *H04W 28/24* (2013.01); *H04W 28/26* (2013.01); *H04W 48/10* (2013.01); *H04W 48/12* (2013.01); *H04W 48/17* (2013.01); *H04W 48/18* (2013.01); *H04W 88/02* (2013.01); *H04W 92/045* (2013.01); *H04W 92/12* (2013.01)

(58) Field of Classification Search
CPC ..... H04W 28/26; H04W 48/10; H04W 48/17; H04W 76/10; H04W 88/02; H04W 92/045; H04W 92/12
See application file for complete search history.

(56) References Cited

U.S. PATENT DOCUMENTS

| | | | | |
|---|---|---|---|---|
| 9,775,045 | B2* | 9/2017 | Li | H04W 16/02 |
| 10,142,994 | B2* | 11/2018 | Lee | H04W 28/16 |
| 10,172,009 | B1* | 1/2019 | Altay | H04W 12/08 |
| 10,268,474 | B2* | 4/2019 | Stammers | H04W 4/80 |
| 10,397,892 | B2* | 8/2019 | Vrzic | H04W 76/12 |
| 10,433,174 | B2* | 10/2019 | Lee | H04L 63/205 |
| 10,595,268 | B2* | 3/2020 | Lee | H04W 68/02 |

(Continued)

*Primary Examiner* — Alpus Hsu (57) ABSTRACT

Systems and methods are provided for network slice selection during an initial connection. A wireless station receives, from a core network device, network slice data for each network slice available via the wireless station, wherein the network slice data includes a slice identifier and corresponding slice characteristics for each network slice. The wireless station receives, from a user equipment (UE) device, a registration request message that indicates a network slice characteristic required by an application being executed on UE device. The wireless station selects, based on the network slice data from the core network device and the network slice characteristic from the UE device, one of the slice identifiers for servicing the UE device.

20 Claims, 9 Drawing Sheets

(56) References Cited

U.S. PATENT DOCUMENTS

| | | | | |
|---|---|---|---|---|
| 10,616,934 | B2* | 4/2020 | Talebi Fard | H04W 48/00 |
| 2017/0339688 | A1* | 11/2017 | Singh | H04W 76/11 |
| 2018/0270744 | A1* | 9/2018 | Griot | H04W 88/18 |
| 2019/0007921 | A1* | 1/2019 | Schliwa-Bertling | H04W 76/10 |
| 2019/0014504 | A1* | 1/2019 | Shimojou | H04W 28/24 |
| 2019/0028941 | A1* | 1/2019 | Zee | H04W 36/32 |
| 2019/0075578 | A1* | 3/2019 | Kim | H04W 48/10 |
| 2019/0098536 | A1* | 3/2019 | Qiao | H04W 36/12 |
| 2019/0098537 | A1* | 3/2019 | Qiao | H04W 36/10 |
| 2019/0098569 | A1* | 3/2019 | Hou | G06F 16/2471 |
| 2019/0150081 | A1* | 5/2019 | Qiao | H04W 60/005 370/329 |
| 2019/0166467 | A1* | 5/2019 | Livanos | H04W 8/04 |
| 2019/0166644 | A1* | 5/2019 | Shaw | H04L 41/0803 |
| 2019/0174321 | A1* | 6/2019 | Sun | H04W 48/14 |
| 2019/0182875 | A1* | 6/2019 | Talebi Fard | H04W 76/11 |
| 2019/0288873 | A1* | 9/2019 | Camarillo Garvia | H04L 45/74 |
| 2019/0313468 | A1* | 10/2019 | Talebi Fard | H04W 76/12 |
| 2019/0335392 | A1* | 10/2019 | Qiao | H04W 48/16 |
| 2019/0357122 | A1* | 11/2019 | Li | H04W 48/14 |
| 2019/0357130 | A1* | 11/2019 | Garcia Azorero | H04W 76/12 |
| 2019/0357131 | A1* | 11/2019 | Sivavakeesar | H04W 36/00835 |
| 2019/0373441 | A1* | 12/2019 | Ryu | H04W 8/08 |
| 2019/0387401 | A1* | 12/2019 | Liao | H04W 36/08 |
| 2020/0057860 | A1* | 2/2020 | Patil | H04L 41/5006 |
| 2020/0068074 | A1* | 2/2020 | Cai | H04M 15/8235 |

* cited by examiner

METHOD AND SYSTEM FOR NETWORK SLICE IDENTIFICATION AND SELECTION

BACKGROUND

Fifth Generation (5G) networks may use different frequencies, different radio access technologies, and different core network functions that can provide an improved experience over legacy wireless networks (e.g., 4G networks). Optimal uses of new features available through 5G networks continue to be explored.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

A technology available in new wireless networks, such as Fifth Generation New Radio networks (5G-NR), is network slicing. Using network slicing, a physical network may be sectioned (or "sliced") into multiple, virtual, end-to-end networks. Each network slice may be dedicated for different types of services with different characteristics and requirements (e.g., latency, voice, jitter, bandwidth, pricing, etc.). As used herein, the term "slice" or "network slice" refers to a complete logical network including a Radio Access Network (RAN) and Core Network that provides certain telecommunication services and network capabilities that can vary from slice to slice. Selection of network slices can, thus, have significant impact on network performance and user experience.

When applying current standards, in some instances, user equipment (UE, also referred to herein as a UE device) may be configured to use a particular network slice upon connection to a network (e.g., a 5G network). In other instances (e.g., when a UE device is a multipurpose device with multiple applications), a UE device may not be configured to use a particular network slice and a default network slice may be selected by the network during an initial radio connection period. The default network slice may not be an optimal choice for the type of network traffic initiated by the UE device. Upon recognizing that a default network slice does not have the optimal characteristics for a particular application, the core network may switch the UE device over to a different network slice better suited for the particular application. This post-connection switchover requires usage of additional network and end device resources, and may result in an application experiencing less-than-optimal network performance during initial communications.

Systems and methods described herein provide a slice ID for use during initial network attachment. A slice ID is added to the initial communications to identify each slice's capabilities, slice characteristics, slice availability, price plan info, etc. Based on this information, when a UE device attaches to the network (e.g., during a radio connection establishment procedure or other procedure that is a part of an attachment procedure), the UE device, an application, or a serving wireless station may select an appropriate network slice for servicing the application during an initial connection.

Figure 1:
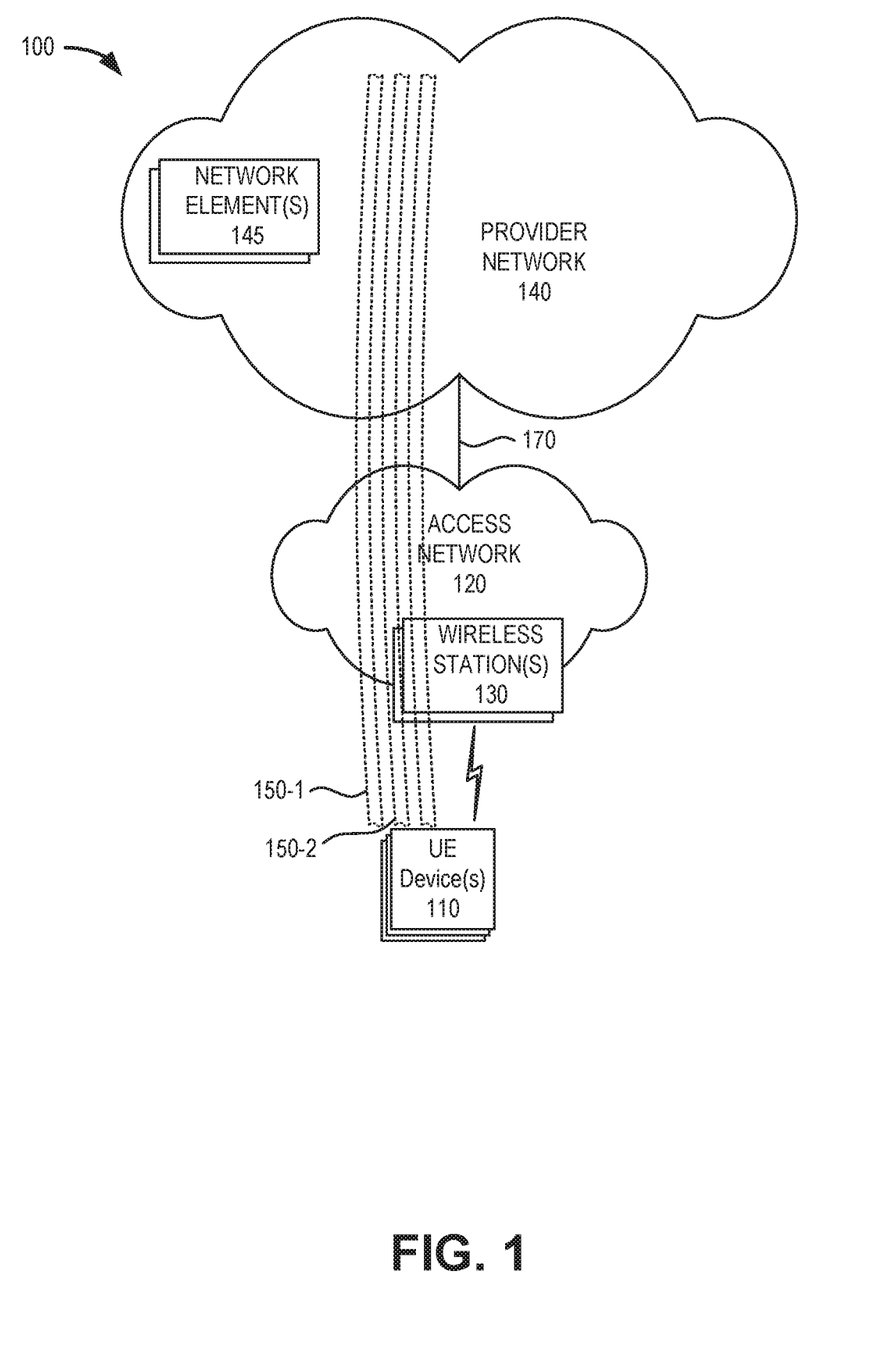
FIG. 1 is a diagram illustrating an environment according to an implementation described herein.

FIG. 1 is a diagram illustrating concepts described herein. As shown in FIG. 1, an environment 100 may include one or more UE devices 110, an access network 120, one or more wireless stations 130, and a provider network 140. Each UE 110 may connect to access provider network 140 via access network 120 using one of multiple available network slices 150 (e.g., slice 150-1, 150-2, etc.).

UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a global positioning system (GPS) device; a laptop computer, a tablet computer, or another type of portable computer; a media playing device; a portable gaming system; and/or any other type of computer device with wireless communication capabilities and a user interface. UE device 110 may be used for voice communication, mobile broadband services (e.g., video streaming, real-time gaming, premium Internet access etc.), best-effort data traffic, and/or other types of applications. In other implementations, UE device 110 may correspond to a wireless MTC device that communicates wirelessly with other devices over a machine-to-machine (M2M) interface.

According to exemplary implementations described herein, UE device 110 may use multiple applications or services that are optimally supported by different types of network slices 150. UE device 110 may include logic to store optimal characteristics necessary to use each application/service, store available network slice characteristics, and/or include requested network slice characteristics in initial connection request messages to a wireless station 130.

Access network 120 may provide access to provider network 140 for wireless devices, such as UE device 110. Access network 120 may enable UE device 110 to connect to provider network 140 for Internet access, non-IP data delivery, cloud computing, mobile telephone service, Short Message Service (SMS) message service, Multimedia Message Service (MMS) message service, and/or other types of data services. Access network 120 may include wireless stations 130, and UE devices 110 may wirelessly communicate with access network 120 via wireless station 130. Access network 120 may establish a packet data network connection between UE device 110 and provider network 140 via one or more Access Point Names (APNs). For example, wireless access network 120 may establish an Internet Protocol (IP) connection between UE device 110 and provider network 140. In another implementation, access network may provide access to a service or application layer network, a cloud network, a multi-access edge computing (MEC) network, a fog network, and so forth. Furthermore, access network 120 may enable a server device to exchange data with UE device 110 using a non-IP data delivery method such as Data over Non-Access Stratum (DoNAS).

Access network 120 may include a 5G access network or another advanced network that support network slicing. Additionally access network may include functionality such as a mm-wave Radio Access Network (RAN); advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless station 130 may include a gNodeB base station device that includes one or more devices (e.g., wireless transceivers) and other components and functionality that allow UE device 110 to wirelessly connect to access network 120. Wireless station 130 may correspond to a macrocell or to a small cell (e.g., a femtocell, a picocell, a microcell, etc.). In other implementations, wireless station 130 may include another type of base station for another type of wireless network that supports network slicing. Wireless station 130 may include or be associated with one or more network slices 150.

Provider network 140 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. In one implementation, provider network 140 may allow the delivery of Internet Protocol (IP) services to UE device 110, and may interface with other external networks, such as private IP networks.

Wireless stations 130 may connect to provider network 140 via backhaul links 170. According to one implementation, provider network 140 may include a core network that serves as a complementary network for one or multiple access networks 120. For example, provider network 140 may include the core part of a 5G New Radio network, etc. Depending on the implementation, provider network 140 may include various network elements 145, such as a gateway, a support node, a serving node, a router, a switch, a bridge, as well other network elements pertaining to various network-related functions, such as billing, security, authentication and authorization, network polices, subscriber profiles, etc. In some implementations, provider network 140 may include an Internet Protocol Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

Network slices 150 may be configured with different characteristics to support different types of applications and/or services, such as video streaming, massive Internet-of-Things (IoT), autonomous driving, etc. A default network slice 150 may not be an optimal choice for the type of network traffic initiated by the UE device 110 for a specific application. As described further herein, providing wireless stations 130 and/or UE devices 110 with slice characteristics may permit an optimal network slice selection during initial attachment and reduce the need for post-connection slice handovers. According to implementations described further herein, each wireless station 130 may store in a local memory a table of available network slices supported through the wireless station 130. According to one implementation, the wireless station 130 may store slice selection logic to match a UE device 110 to a particular network slice during an initial registration. According to another implementation, the wireless stations 130 may broadcast network slice characteristics to enable UE device 110 to request a preferred network slice 150.

Although FIG. 1 shows exemplary components of environment 100, in other implementations, environment 100 may include fewer components, different components, differently arranged components, or additional functional components than depicted in FIG. 1. For example, in one implementation, environment 100 may include an MEC network that provides applications and services at the edge of a network, such as provider network 140. Additionally or alternatively, one or more components of environment 100 may perform functions described as being performed by one or more other components of environment 100.

Figure 2:
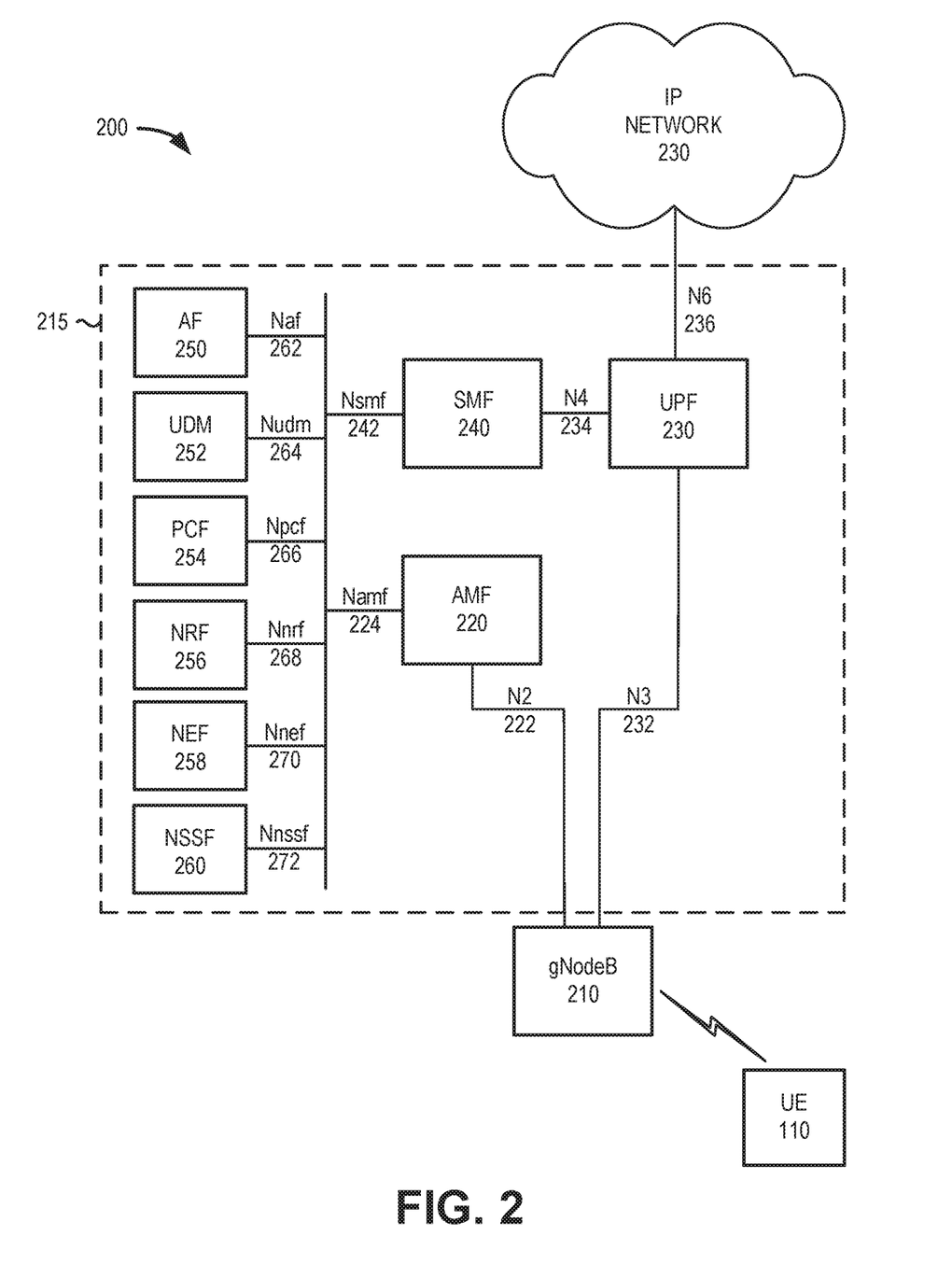
FIG. 2 is a diagram illustrating exemplary components of the access network of FIG. 1.

FIG. 2 is a diagram illustrating a network environment 200 that includes exemplary components of environment 100 according to an implementation described herein. As shown in FIG. 2, network environment 200 may include UE device 110, gNodeB (gNB) 210, a core network 215, and an IP network 230. gNB 210 may correspond to one of wireless stations 130. Core network 215 and IP network 230 may correspond to, or be included in, provider network 140.

Core network 215 may include an Access and Mobility Management Function (AMF) 220, a User Plane Function (UPF) 230, a Session Management Function (SMF) 240, an Application Function (AF) 250, a Unified Data Management (UDM) 252, a Policy Control Function (PCF) 254, a Network Repository Function (NRF) 256, a Network Exposure Function (NEF) 258, and a Network Slice Selection Function (NSSF) 260. AMF 220, UPF 230, SMF 240, AF 250, UDM 252, PCF 254, NRF 256, NEF 258, and NSSF 260 may correspond to network elements 145 of FIG. 1 and may each be implemented as separate network devices or as nodes shared among one or more network devices. While FIG. 2 depicts a single AMF 220, UPF 230, SMF 240, AF 250, UDM 252, PCF 254, NRF 256, NEF 258, and NSSF 260 for illustration purposes, in practice, FIG. 2 may include multiple gNBs 210, AMFs 220, UPFs 230, SMFs 240, AFs 250, UDMs 252, PCFs 254, NRFs 256, NEFs 258, and/or NSSFs 260.

gNB 210 may include one or more devices (e.g., wireless stations) and other components and functionality that enable UE device 110 to wirelessly connect to access network 120 using 5G Radio Access Technology (RAT). For example, gNB 210 may include one or more cells, with each gNB 210 including a wireless transceiver with an antenna array configured for mm-wave wireless communication. gNB 210 may communicate with AMF 220 using an N2 interface 222 and communicate with UPF using an N3 interface 232. According to implementations described herein, gNB 210 may receive and store network slice characteristics which may be broadcast to UE devices 110 and/or used to select a preferred network slice 150 during an initial attachment process for UE device 110.

AMF 220 may perform registration management, connection management, reachability management, mobility management, lawful intercepts, Short Message Service (SMS) transport between UE device 110 and an SMS function (not shown in FIG. 2), session management messages transport between UE device 110 and SMF 240, access authentication and authorization, location services management, functionality to support non-3GPP access networks, and/or other types of management processes. AMF 220 may be accessible by other function nodes via a Namf interface 224. In one implementation, AMF 220 may have multiple instances, where each AMF instance is associated with a particular network slice (e.g., network slice 150). According to implementations described herein, an AMF may receive and forward network slice characteristics to gNB 210.

UPF 230 may maintain an anchor point for intra/inter-RAT mobility, maintain an external Packet Data Unit (PDU) point of interconnect to a data network (e.g., IP network 230, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a Radio Access Network (RAN) node (e.g., gNB 210), and/or perform other types of user plane processes. UPF 230 may communicate with SMF 240 using an N4 interface 234 and connect to IP network 201 using an N6 interface 236. According to an implementation described herein, UPF 230 may store network slice characteristics, which may be provided (e.g., via AMFs 220) to gNBs 210 for use in selecting a preferred network slice 150 during an initial attachment process for UE device 110.

SMF 240 may perform session establishment, modification, and/or release, perform IP address allocation and management, perform Dynamic Host Configuration Protocol (DHCP) functions, perform selection and control of UPF 230, configure traffic steering at UPF 230 to guide traffic to the correct destination, terminate interfaces toward PCF 254, perform lawful intercepts, charge data collection, support charging interfaces, control and coordinate of charging data collection, termination of session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, application influence on traffic routing, accessing NEF 258, interacting with a policy framework for policy control, and/or other types of applications. AF 250 may be accessible via an Naf interface 262.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 264.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 266.

NRF 256 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 256 may be accessible via an Nnrf interface 268.

NEF 258 may expose capabilities and events to other NFs, including third-party NFs, AFs, edge computing NFs, and/or other types of NFs. Furthermore, NEF 258 may secure provisioning of information from external applications to access network 120, translate information between access network 120 and devices/networks external to access network 120, support a Packet Flow Description (PFD) function, and/or perform other types of network exposure functions. NEF 258 may be accessible via Nnef interface 270.

NSSF 260 may select a set of network slice instances to serve a particular UE device 110, determine network slice selection assistance information (NSSAI), determine a particular AMF 220 to serve a particular UE device 110, and/or perform other types of processes associated with network slice selection or management. NSSF 260 may be accessible via Nnssf interface 272. According to an implementation described herein, NSFF 260 may store network slice characteristics, which may be provided (e.g., via AMFs 220) to gNBs 210 for use in selecting a preferred network slice 150 during an initial attachment process for UE device 110.

Although FIG. 2 shows exemplary components of core network 215, in other implementations, core network 215 may include fewer components, different components, differently arranged components, or additional components than depicted in FIG. 2. Additionally or alternatively, one or more components of core network 215 may perform functions described as being performed by one or more other components of core network 215. For example, core network 215 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 2, additionally or alternatively, core network 215 may include a reference point architecture that includes point-to-point interfaces between particular function nodes.

Figure 3:
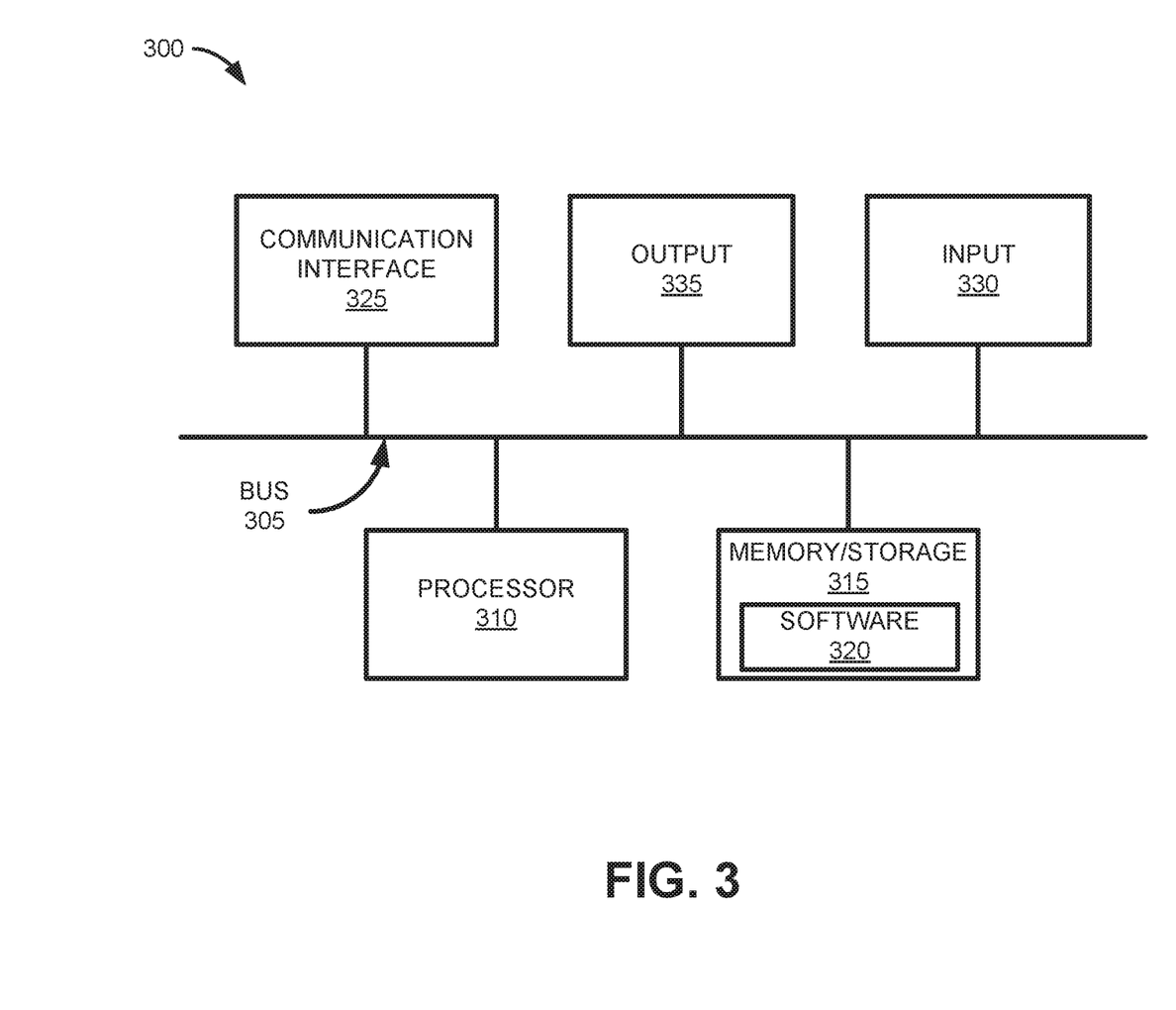
FIG. 3 is a diagram illustrating exemplary components of a device that may correspond to one or more of the devices illustrated and described herein.

FIG. 3 is a diagram illustrating example components of a device 300 according to an implementation described herein. UE device 110, gNB 210, AMF 220, UPF 230, SMF 240, AF 250, UDM 252, PCF 254, NRF 256, NEF 258, NSSF 260, and/or other components of access network 120 may each include one or more devices 300. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, UE device 110 and/or wireless station 130 may include logic to perform tasks, as described herein, based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
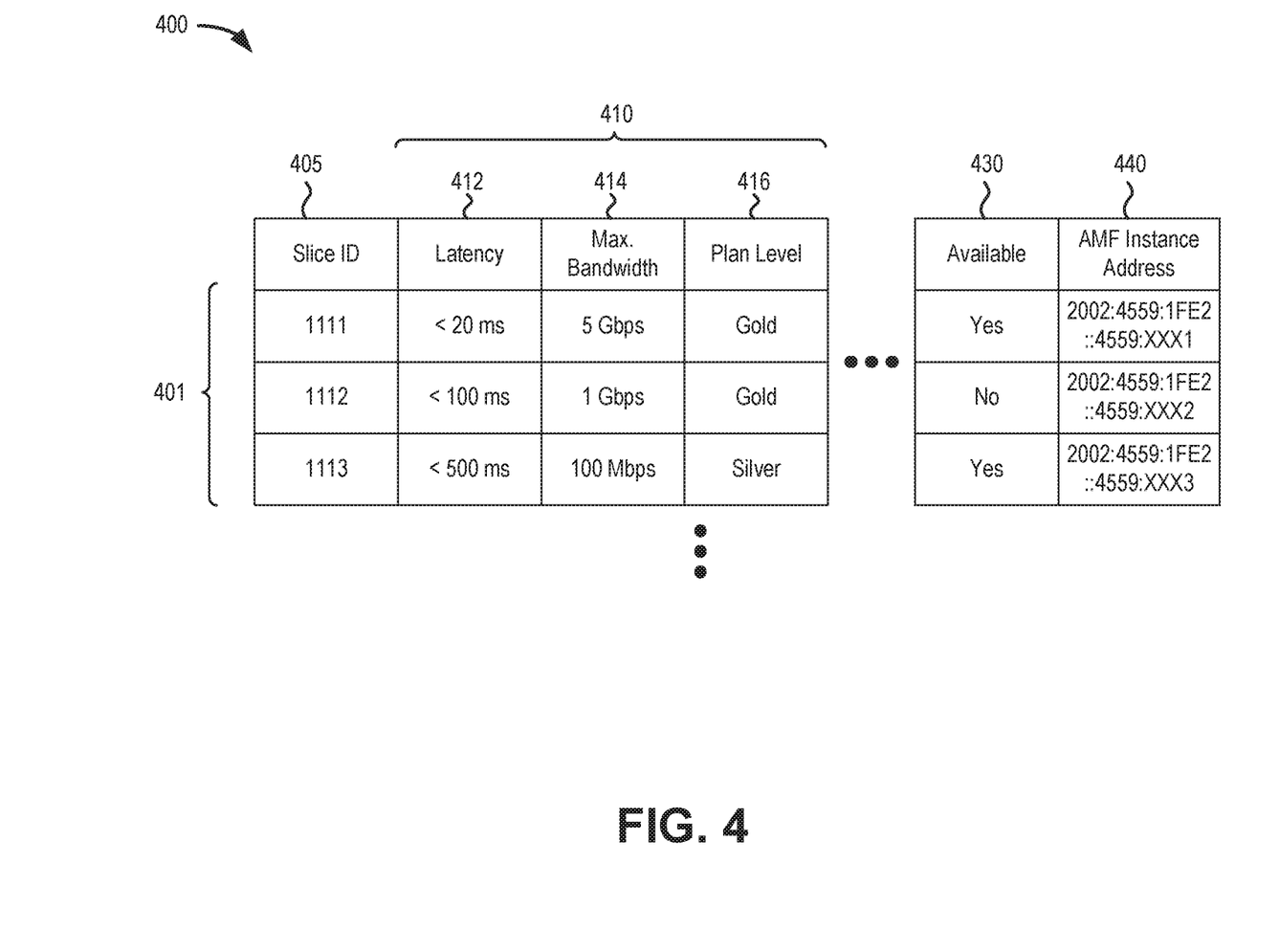
FIG. 4 is a diagram illustrating an exemplary implementation of a slice ID database.

FIG. 4 is a diagram depicting an exemplary implementation of a slice ID database 400. As shown, a data structure of slice ID database 400 may include multiple entries 401, with each entry 401 including slice identifier (ID) field 405, one or more slice characteristics fields 410, an available field 430, and an AMF instance address field 440. Slice ID database 400 may be stored locally in UE 110 and gNB 210 (e.g., in memory 315). In one implementation, slice ID database 400 may be updated dynamically by each UE 110. In a further implementation, a version of slice ID database 400 may be stored in a memory at each gNB 210 in network environment 200.

Slice ID field 405 may store an identifier for a network slice 150. The unique identifier includes a single identifier associated with the network slice. In one implementation, the unique ID stored in field 405 may correspond to an IP address for an AMF instance (AMF 220) that supports the network slice. That is, each AMF 220 instance may be associated with a unique network slice 150. In another implementation, the identifier for the network slice 150 may be a string (e.g., numerical, alpha-numerical, etc.) different from the IP address of the AMF instance.

Slice characteristics fields 410 may include provisioned characteristics or features of a particular network slice associated with the slice ID in slice ID field 405. Examples of slice characteristics fields 410 include a latency field 412, a bandwidth field 414, and a plan level field 416.

Latency field 412 may store a particular latency value associated with the particular network slice for the particular slice ID. The latency value may reflect, for example, a maximum end-to-end latency configured for the corresponding network slice.

Bandwidth field 414 may represent the total bandwidth supported by a particular network slice associated with a slice ID in slice ID field 405. Bandwidth field 414 may reflect, for example, a maximum bandwidth associated with limiting link in the network slice. In other implementations, bandwidth field 414 may include separate uplink and downlink bandwidth values.

Plan level field 416 may identify a particular service level associated with the network slice in slice ID field 405. Plan level field 416 may include an indicator (e.g., "gold" level, "silver" level, "bronze" level, etc.) associated with a particular subscription price, quality of service (QoS), and/or data rate limits. A service level may define a particular group of service parameters for a network slice as defined by a service level agreement and may be restricted to customers who subscribe to that service level.

Available field 430 may include a real-time (or near-real-time, such as no more than a half-second delay) indication of whether a network slice for a particular entry 401 can be assigned to a UE 110. For example, congested network conditions may temporarily preclude assignment of one or more network slices.

AMF address field 440 may include an IP address for a specific AMF instance associated with an entry 401. The address in AMF address field 440 may be used, for example, by gNB 210 to initiate a connection requested by a UE 110. In another implementation, a Globally Unique AMF ID (GUAMI) or a different type of identifier may be used in AMF address field 440.

Slice ID database 400 is depicted in FIG. 4 as including a tabular data structure with a certain number of fields having certain content. The tabular data structure of slice ID database 400 shown in FIG. 4, however, is for illustrative purposes. Other types of data structures may alternatively be used. The number, types, and content of the entries and/or fields in the data structure of slice ID database 400 is also for illustrative purposes. Other data structures having different numbers of, types of and/or content of, the entries and/or the fields may be implemented. Therefore, slice ID database 400 may include additional, fewer and/or different entries and/or fields than those depicted in FIG. 4.

Figure 5:
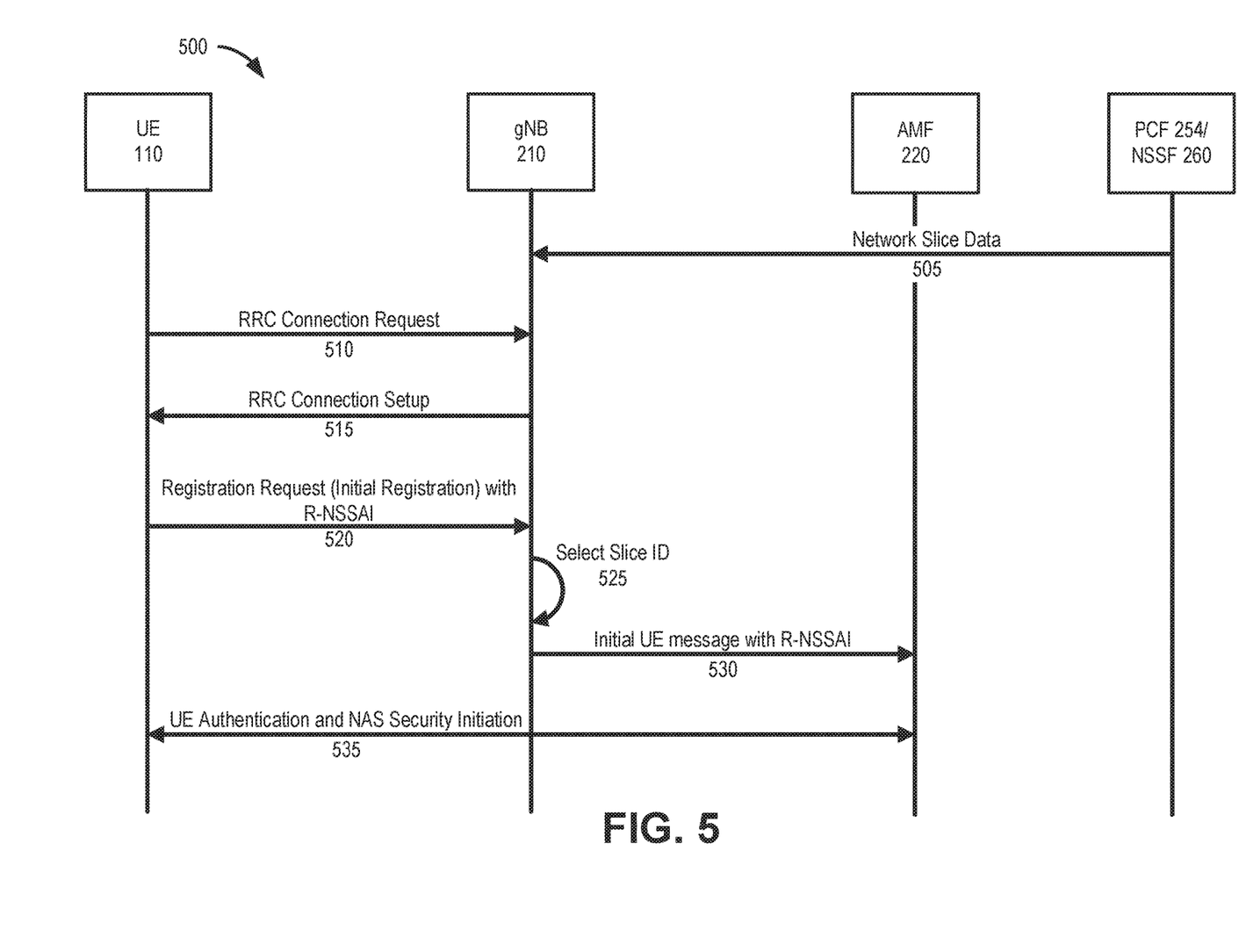
FIGS. 5 and 6 are signal flow diagrams illustrating exemplary communications among devices in a portion of the network of FIG. 2.

FIG. 5 is a diagram illustrating exemplary communications for network slice identification and selection in a portion 500 of network environment 200. More specifically, FIG. 5 is a diagram illustrating an exemplary network slice identification and selection by gNB 210. Network portion 500 may include UE device 110, gNB 210, AMF 220, and PCF 254/NSSF 260. Communications shown in FIG. 5 provide simplified illustrations of communications in network portion 500 and are not intended to reflect every signal or communication exchanged between devices.

Referring to FIG. 5, network slice data 505 may be provided to gNB 210. Network slice data 505 may include, for example, data used to compile slice ID database 400, such as a slice ID, slice characteristics, and an AMF instance address for each network slice available via a particular gNB 210. According to implementations described herein, network slice data 505 may be provided on a continuously updated (e.g. dynamic) basis to reflect current network conditions. In one implementation, different network slice data 505 may be provided from PCF 254 or NSSF 260 (e.g., via an AMF 210 or UPF 230) to different gNBs 210. That is, network slice data 505 for one gNB 210 may be different than network slice data 505 for a different gNB 210.

Assume subsequent to a power-up procedure of UE device 110, UE device 110 generates an RRC Connection Request message 510. For example, an upper layer of a stack may request that a radio resource control layer establish an RRC connection with gNB 210. In response, the radio resource control layer of UE device 110 generates and send RRC Connection Request message 510 to gNB 210 via a control channel. gNB 210 may receive RRC Connection Request message 510 and respond with an RRC Connection Setup message 515. gNB 210 may transmits the RRC Connection Setup message to UE device 110 via the control channel.

UE device 110 generates and transmits a registration request message 520 in response to receiving RRC Connection Setup message 515. When registration request message 520 is provided in the context of an initial registration, UE device 110 may include an information element (IE) with service and/or slice characteristics needed to support a specific application for UE device 110. According to one implementation (e.g., when UE device 110 is a multipurpose device that is configured to use a particular network slice), registration request message 520 may include requested network slice selection assistance information (R-NSSAI) to indicate the services and/or characteristics required by an application being executed on UE device 110. For example, the R-NSSAI may include a minimum latency requirement, a bandwidth requirement, etc. required for a specific application.

gNB 210 may receive registration request message 520 (including the R-NSSAI) from UE device 110 and extract the service and/or slice characteristics from the R-NSSAI. As indicated by reference 525, gNB 210 may use the service and/or slice characteristics from the R-NSSAI, in conjunction with a locally stored table of network slice data 505 (e.g., slice ID database 400), to select an appropriate slice ID. Using slice ID database 400, for example, gNB 210 may identify the IP address for the appropriate AMF 220 that corresponds to the slice ID.

As further shown in FIG. 5, gNB 210 may forward an Initial UE Message 530 to the AMF 220 associated with the selected slice ID. In one implementation, AMF 220 may confirm (e.g., with one or more other core network elements, such as UPF 230, PCF 254, or NSSF 260), that the user plane of the selected network slice can support communications for the application on UE device 110. In another implementation, gNB 210's selection of an entry 401 from slice ID database 400 (e.g., field 430) may serve as initial confirmation that the selected network slice can support communications for the application on UE device 110. In response to receiving Initial UE Message 530, AMF 220 may conduct exchanges with UE device 110 for UE authentication and non-access stratum (NAS) security initiation, as indicated by reference 535.

Figure 6:
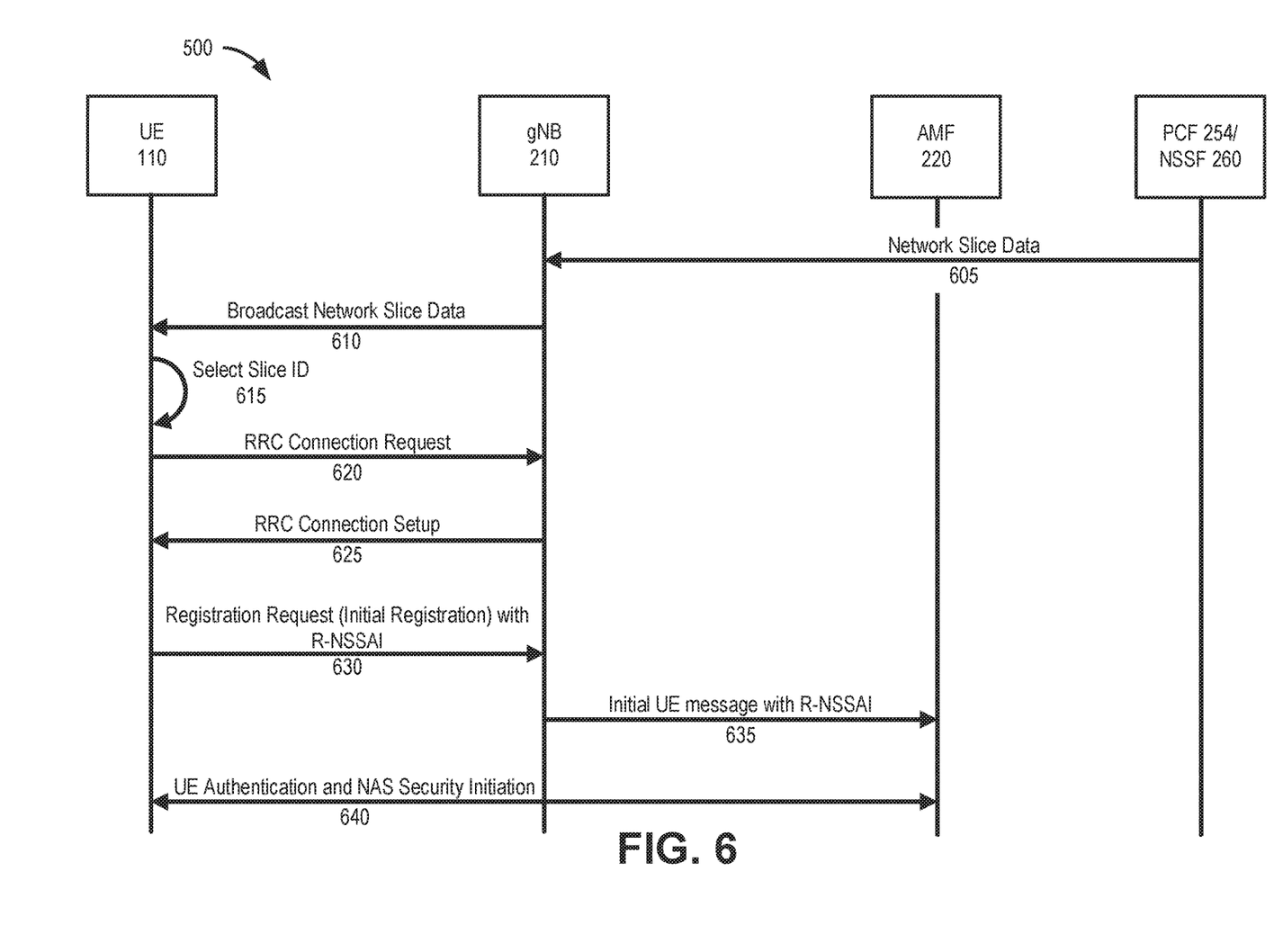

FIG. 6 is a diagram illustrating different exemplary communications for network slice identification and selection in network portion 500. More specifically, FIG. 6 is a diagram illustrating an exemplary network slice identification and selection by UE 110. Network portion 500 may include UE device 110, gNB 210, AMF 220, and PCF 254. Communications shown in FIG. 6 provide simplified illustrations of communications in network portion 500 and are not intended to reflect every signal or communication exchanged between devices.

Referring to FIG. 6, network slice data 605 may be provided to gNB 210. Network slice data 605 may include, for example, data used to compile slice ID database 400, such as a slice ID, slice characteristics, and an AMF instance address for each network slice available via a particular gNB 210. According to implementations described herein, network slice data 605 may be provided on a continuously updated (e.g. dynamic) basis to reflect current network conditions. In one implementation, different network slice data 605 may be provided from PCF 254 (e.g., via an AMF 210 or UPF 230) to different gNBs 210. That is, network slice data 505 for one gNB 210 may be different than network slice data 505 for a different gNB 210. In one implementation, gNB 210 may use network slice data 605 to generate and locally store slice ID database 400.

As shown in FIG. 6, gNB 210 may periodically broadcast 610 network slice data 605 to UE devices 110 in the coverage area of gNB 210. Broadcast 610 may be provided over a new radio physical broadcast channel (NR-PBCH) to announce what network slices are available in the gNB coverage area and the characteristic of each network slice. UE 110 may receive broadcast 610, including the slice availability and characteristics. As shown in reference 615, an application on UE device 110 (e.g., with human intervention, if necessary) may select an appropriate network slice by comparing service requirements for the application with the slice availability and characteristics most-recently received over broadcast 610. UE device 110 may then send a requested slice ID (e.g., as a corresponding R-NSSAI parameter) to gNB 210 during the RRC connection process that includes RRC Connection Request message 620, RRC Connection Setup message 625, and registration request message 630. In the example of FIG. 6, the requested slice ID may be included with registration request message 630. In another implementation, registration request message 630 may include a Globally Unique AMF ID (GUAMI) for an AMF 220 that supports a requested slice.

gNB 210 may receive the requested slice ID in registration request message 630 from UE device 110 and extract the slice ID from the R-NSSAI. Using slice ID database 400, for example, gNB 210 may identify the IP address for the appropriate AMF 220 that corresponds to the received slice ID. As further shown in FIG. 6, gNB 210 may forward an Initial UE Message 635 to the AMF 220 associated with the requested slice ID. In respond to receiving Initial UE Message 635, AMF 220 may confirm the requested slice ID is appropriate and conduct exchanges with UE device 110 for UE authentication and non-access stratum (NAS) security initiation, as indicated by reference 640.

Figure 7:
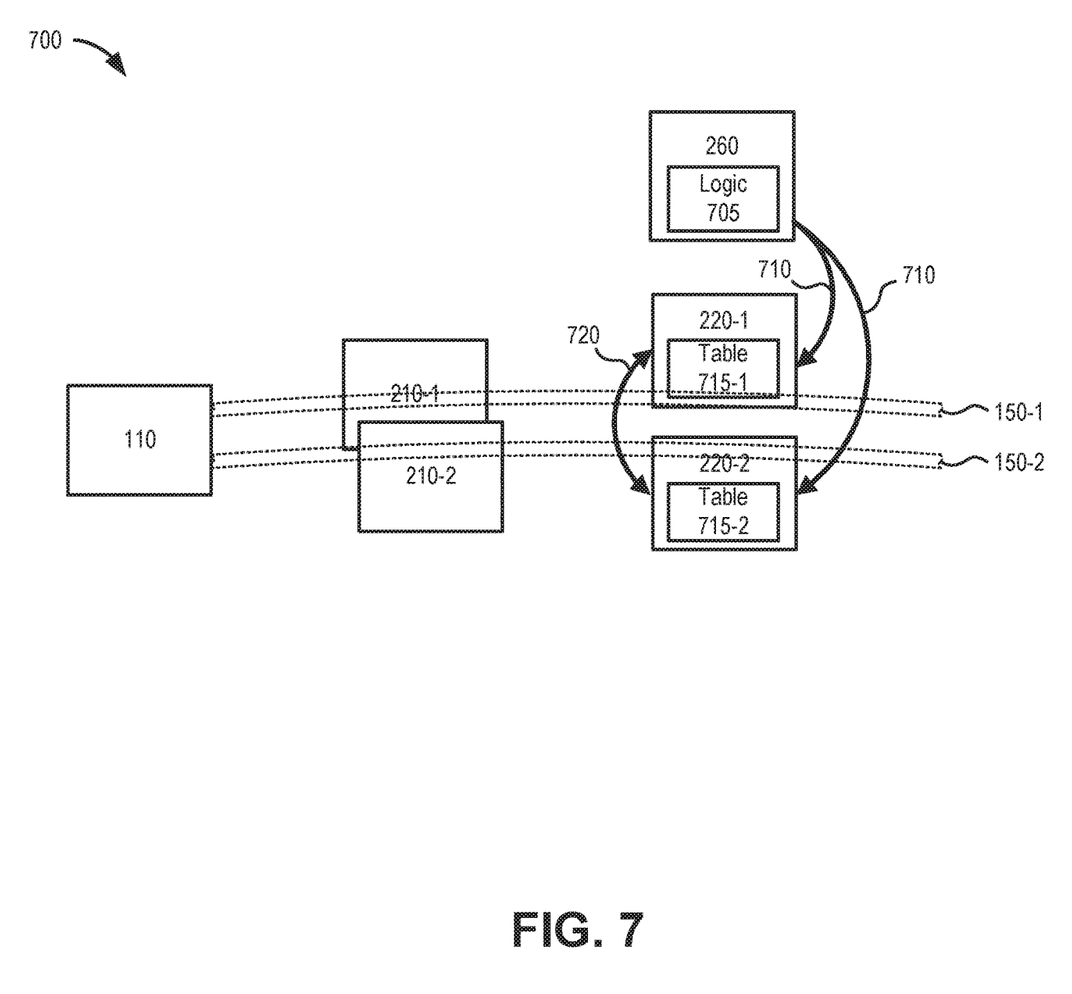
FIG. 7 is a block diagram illustrating exemplary communications among devices in another portion of the network of FIG. 2.

FIG. 7 is a diagram illustrating exemplary communications for network slice selection and handover in a portion 700 of network environment 200. More specifically, FIG. 7 is a diagram illustrating an exemplary core network slice selection for UE device 110 during a handoff. Network portion 700 may include UE device 110, gNBs 210-1 and 210-2, AMFs 220-1 and 220-2, and NSSF 260. The simplified communications shown in FIG. 7 are for illustration and do not include additional handover communications, such as a handover between different UPF 230 instances, etc.

In the example of FIG. 7, assume UE device 110 is being switched away from using network slice 150-1 to using network slice 150-2. For example, network load conditions (e.g., in access network 120 or provider network 140) may preclude use of network slice 150-1, or network slice 150-2 may be preferable because network 150-1 is not available when UE device 110 (e.g., in a mobility context) transitions from gNB 210-1 to gNB 210-2. In another implementation, communications in FIG. 7 may be used to override a network slice selection from an initial registration (e.g., override a slice selection from FIG. 5).

Slice selection logic 705 (a decision tree, for example) may reside in NSSF 260 (as shown in FIG. 7) or AMFs 220. Slice selection logic may associate any application or type of application with specific slice characteristics (e.g., latency, bandwidth, availability, etc.). Results 710 of slice selection logic may be provided to AMFs 220 on either a periodic or dynamic basis. That is, the slices and needs may be statically defined or may change dynamically when network conditions and/or requirements change. In one implementation, results 710 may modify the definition/characteristics of an existing network slice 150.

Based on results 710, a table 715 that identifies which slice 150 best suits which application may be generated and stored in AMFs 220 (as shown in FIG. 7) or gNBs 210. In one implementation, table 715 may be incorporated within table 400 described above. In another implementation, table 715 may be a separate table. In one implementation, table 715 may be dynamically updated as results 710 are provided.

In order to perform a handoff from slice 150-1 to slice 150-2, both slices will be recognized (e.g., by AMFs 220) as able to host a specific application being serviced for UE device 110. In one implementation, a dynamic change in results 710 and/or table 715 may indicate that a specific network slice 150 may no longer support an application for UE 110, and AMF 220 or another device in network 215 may force a slice change (e.g., from slice 150-1 to slice 150-2) for UE device 110. Slice to slice communications may be used to effectively perform slice reselection. In one implementation, an AMF 220 for one slice (e.g., AMF 220-1) may exchange communications 720 with an AMF 220 for another slice (e.g., AMF 220-2) before a handover to confirm slice characteristics can support a specific application.

Figure 8:
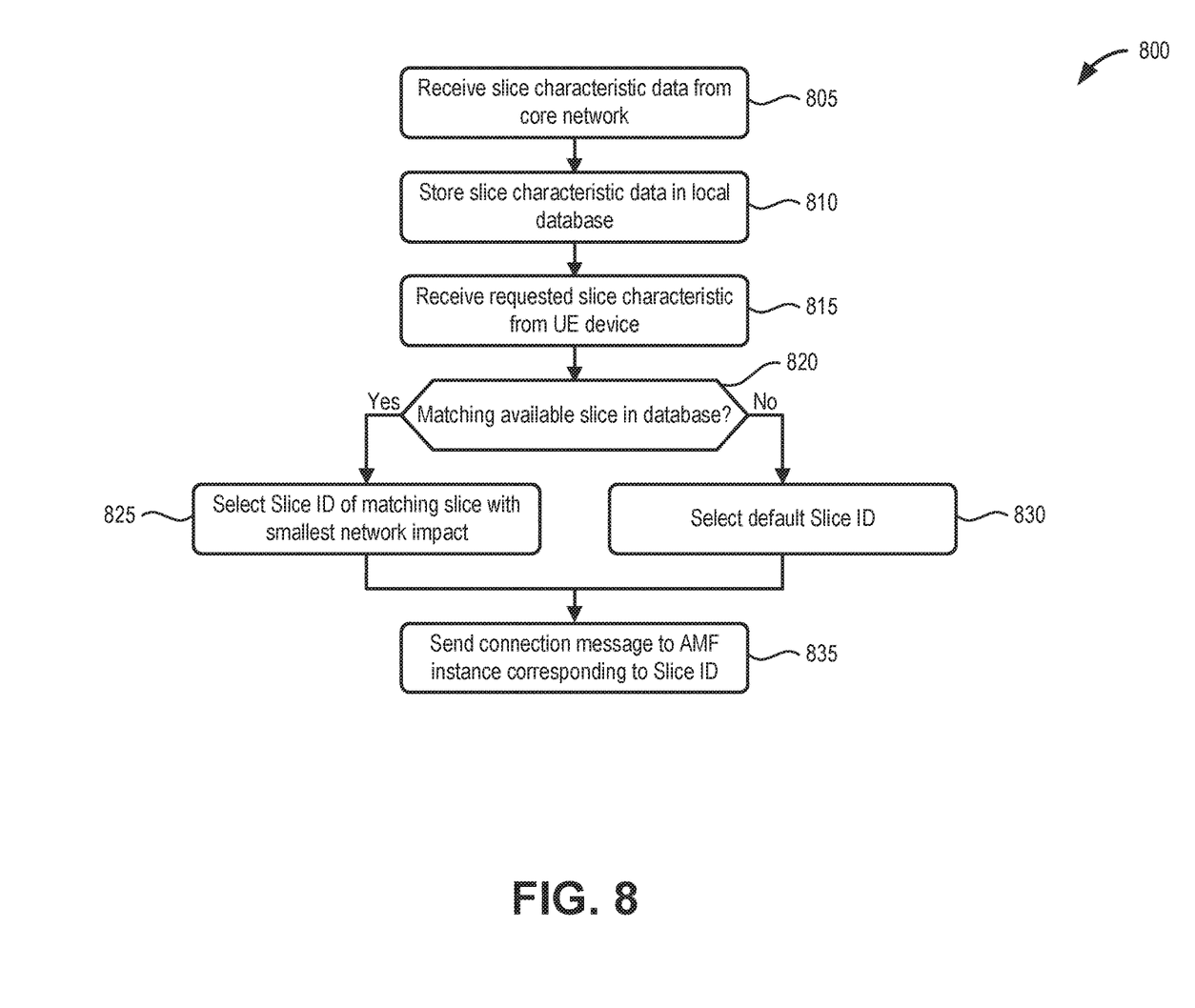
FIGS. 8 and 9 are flow diagrams illustrating exemplary processes for selecting a network slice, according to implementations described herein.

FIG. 8 is a flow diagram illustrating an exemplary process 800 for enabling a wireless station to select a network slice based on input from a UE device, according to an implementation described herein. In one implementation, process 800 may be implemented by gNB 210. In another implementation, process 800 may be implemented by another wireless station 130 and/or in conjunction with one or more other devices in network environment 200.

Referring to FIG. 8, process 800 may include receiving slice characteristic data from a core network (block 805), and storing the slice characteristic data in a local database (block 810). For example, gNB 210 may receive, network slice data (e.g., network slice data 505 of FIG. 5) from core network 215 (e.g., AMF 220 and/or PCF 254) for each network slice available through gNB 210. The network slice data may include, for each network slice, a unique slice ID and corresponding slice characteristics. In some implementations, the network slice data may also include an IP address for each corresponding AMF instance servicing a corresponding network slice. The characteristic data may be stored in a local database of gNB 210 (e.g., slice ID database 400).

Process 800 may further include receiving a requested slice characteristic from a UE device (block 815) and determining if there is an available matching slice in the local database (block 820). For example, gNB 210 may receive a registration request message (e.g., registration request message 520) from UE device 110 that indicates network slice characteristics required by an application being executed on UE device. The network slice characteristics may be included within an R-NSSAI parameter. In one implementation, the requested network slice characteristics may include one or more of a latency value (e.g., <20 milliseconds (ms), <100 ms, etc.), a minimum bandwidth, etc. Using, for example, slice ID database 400, gNB 210 may attempt to match the requested network slice characteristics with characteristics of available network slices.

If there is an available matching slice in the local database (block 820—Yes), process 800 may further include selecting a slice ID of a matching slice with the smallest network impact (block 825). For example, if UE device 110 provides a network slice characteristic with a requested latency of no more than 100 ms, gNB 210 may select (e.g., from slice ID database 400) an entry 401/slice ID field 405 with a latency value closest to 100 ms without exceeding 100 ms.

If there is not an available matching slice in the local database (block 820—No), process 800 may further include selecting a slice ID of a default network slice (block 830). For example, if gNB 210 cannot match one or multiple requested slice characteristics from UE device 110, gNB 210 may use a default network slice (with a default slice ID) for the initial UE connection.

Based on the selected slice ID from process blocks 825 or 830, process 800 may additionally include sending a connection message to an AMF instance corresponding to the selected slice ID (block 835). For example, if gNB 210 selects a slice ID of a matching slice or a default slice, gNB 210 may forward an Initial UE message, or another connection message including NSSAI parameters, to the respective AMF 220 to allow UE device 110 to connection to core network 215.

Figure 9:
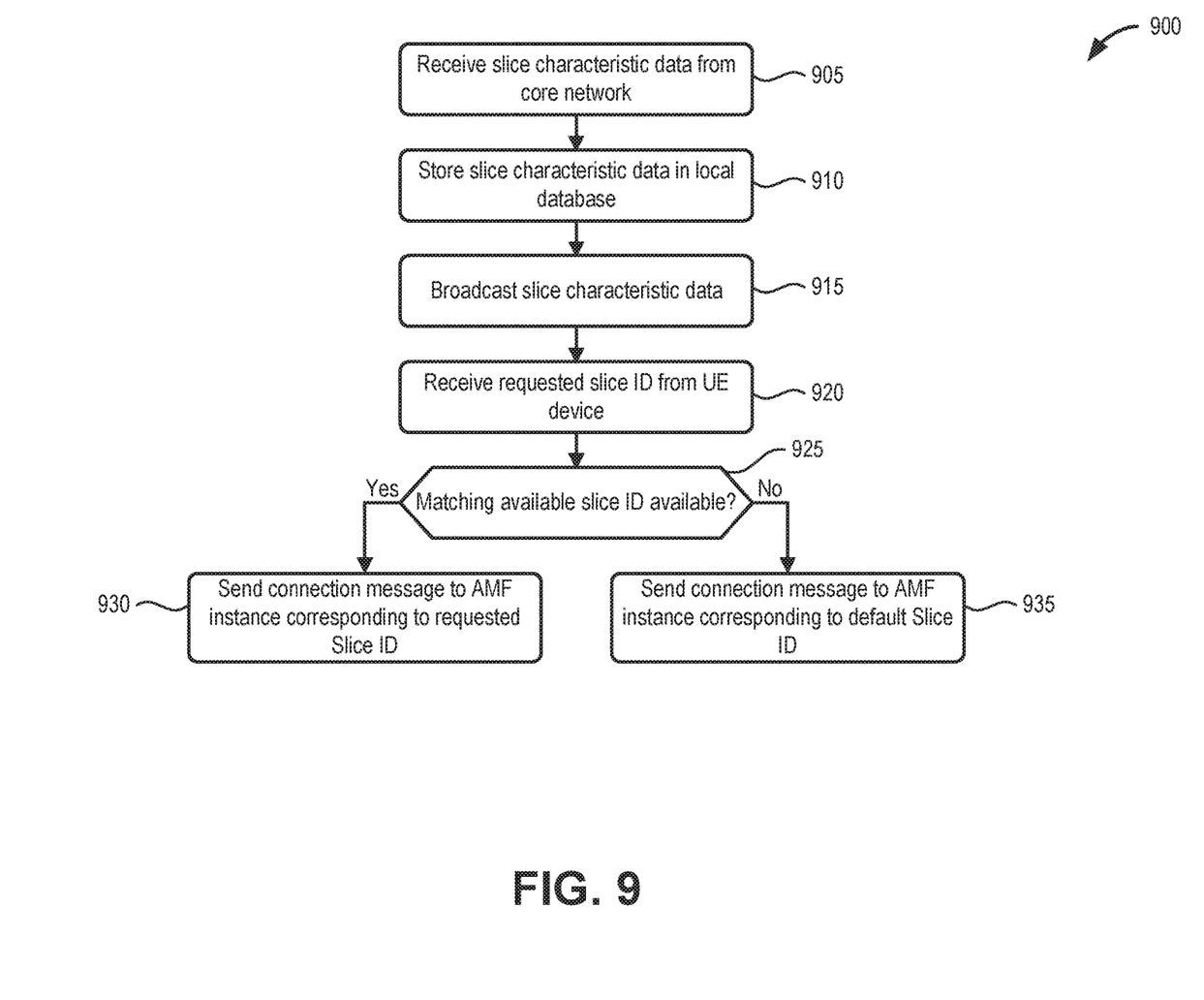

FIG. 9 is a flow diagram illustrating an exemplary process 900 for enabling a UE device to select a network slice, according to an implementation described herein. In one implementation, process 900 may be implemented by gNB 210. In another implementation, process 900 may be implemented by another wireless station 130 and/or in conjunction with one or more other devices in network environment 200.

Referring to FIG. 9, process 900 may include receiving slice characteristic data from a core network (block 905), and storing the slice characteristic data in a local database (block 910). For example, gNB 210 may receive, network slice data (e.g., network slice data 505 of FIG. 5) from core network 215 (e.g., AMF 220 and/or PCF 254) for each network slice available through gNB 210. The network slice data may include, for each network slice, a unique slice ID and corresponding slice characteristics. The network slice data may also include an IP address for each corresponding AMF instance servicing a corresponding network slice. The characteristic data may be stored in a local database of gNB 210 (e.g., slice ID database 400).

Process 900 may also include broadcasting slice characteristic data (block 915). For example, gNB 210 may periodically broadcast network slice data 605 (e.g., via broadcast 610 of FIG. 6) to UE devices 110 in the coverage area of gNB 210. The broadcast may be provided, for example, using a new radio physical broadcast channel (NR-PBCH) to announce the network slices available in the gNB coverage area and the characteristics of each network slice.

Process 900 may further include receiving a requested slice identifier from a UE device (block 920) and determining if there is an available matching slice identifier from the local database (block 925). For example, UE device 110 may receive the broadcast network slice data and locally store the data. When an application executed on UE device 110 causes UE device 110 to initiate an RRC connection request, the application/UE device 110 may select a slice ID with corresponding slice characteristics that match the application. UE may send the requested slice identifier to gNB 210 (e.g., via RRC connection setup complete message the slice identifier included within an R-NSSAI parameter). gNB 210 may receive a registration request message (e.g., registration request message 630) from UE device 110, that indicates network slice ID required by an application being executed on UE device 110. The network slice ID may be included within an R-NSSAI parameter or another message field. Using, for example, slice ID database 400, gNB 210 may attempt to match the requested network slice ID with an available network slice IDs.

If there is an available matching slice ID the local database of the gNB (block 925—Yes), process 900 may further include sending a connection message to an AMF instance corresponding to the requested slice ID (block 930). For example, if UE device 110 provides a network slice ID that matches a slice ID stored locally at gNB 210 (and the correspond slice is indicated as available), gNB 210 may forward an Initial UE message or another connection message to an AMF 220 with the corresponding slice ID to allow UE device 110 to connection to core network 215.

If there is an available matching slice ID the local database of the gNB (block 925—No), process 900 may further include sending a connection message to an AMF instance corresponding to the requested slice ID (block 935). For example, if UE device 110 provides a network slice ID that does not match a slice ID stored locally at gNB 210 (or the correspond slice is indicated as available), gNB 210 may forward an Initial UE message or another connection message to a default AMF instance 220 to allow UE device 110 to connection to core network 215.

Systems and methods described herein provide for network slice selection during an initial connection. A wireless station receives, from a core network device, network slice data for each network slice available via the wireless station, wherein the network slice data includes a slice identifier and corresponding slice characteristics for each network slice. The wireless station receives, from a user equipment (UE) device, a request message that indicates a network slice characteristic pertaining to an application of the UE device. The wireless station selects, based on the network slice data from the core network device and the network slice characteristic from the UE device, one of the slice identifiers for servicing the UE device.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 8 and 9, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A wireless station, comprising:
a first communications interface for sending or receiving data using a wireless access network;
a second communications interface for exchanging data with a core network;
one or more memories to store instructions; and
a processor configured to execute the instructions to:
receive, from the core network via the second communications interface, continuously updated network slice data for network slices available via the wireless station, wherein the continuously updated network slice data includes:
a slice identifier for each network slice of the network slices,
corresponding slice characteristics for each network slice of the network slices, and
an internet protocol (IP) address for an Access and Mobility Management Function (AMF) instance associated with each of the slice identifiers,
store, in the one or more memories, the continuously updated network slice data for the network slices available via the wireless station,
receive, from a user equipment (UE) device via the first communication interface, a registration request message that indicates a network slice characteristic required by an application being executed on the UE device,
determine if there is an available slice in the continuously updated network slice data that corresponds to the network slice characteristic required by the application,
select one of the slice identifiers, from the continuously updated network slice data, for servicing the UE device when the network slice characteristic required by the application corresponds to one of the slice characteristics of the continuously updated network slice data, and
select a default slice identifier for servicing the UE device when the network slice characteristic required by the application does not correspond to one of the slice characteristics of the continuously updated network slice data.

2. The wireless station of claim 1, wherein the processor is further configured to execute the instructions to:
send, to an access management function associated with the selected slice identifier, a message to establish a connection.

3. The wireless station of claim 1, wherein each IP address for the AMF instance is associated with a different slice identifier.

4. The wireless station of claim 1, wherein the continuously updated network slice data further includes a particular service level associated with each of the slice identifiers.

5. The wireless station of claim 1, wherein, when storing the continuously updated network slice data, the processor is further configured to execute the instructions to:
update, in real time, a local data structure.

6. The wireless station of claim 5, wherein the continuously updated network slice data includes a change in availability of one of the network slices.

7. The wireless station of claim 1, wherein the wireless station includes a gNodeB for a New Radio access network.

8. The wireless station of claim 1, wherein the processor is further configured to execute the instructions to:
broadcast, via a downlink broadcast channel, the continuously updated network slice data to the UE device,
wherein receiving the registration request message that indicates network slice characteristics includes receiving a requested slice identifier.

9. A method, comprising:
receiving, by a wireless station and from a core network device, continuously updated network slice data for network slices available via the wireless station, wherein the continuously updated network slice data includes:
a slice identifier for each network slice of the network slices,
corresponding slice characteristics for each network slice of the network slices, and
an internet protocol (IP) address for an Access and Mobility Management Function (AMF) instance associated with each of the slice identifiers;
storing, by the wireless station and in a local memory, the continuously updated network slice data for the network slices available via the wireless station;
receiving, by the wireless station and from a user equipment (UE) device, a registration request message that indicates a network slice characteristic required by an application being executed on the UE device;
determining, by the wireless station, if there is an available slice in the continuously updated network slice data that corresponds to the network slice characteristic required by the application,
selecting, by the wireless station, one of the slice identifiers, from the continuously updated network slice data, for servicing the UE device when the network slice characteristic required by the application corresponds to one of the slice characteristics of the continuously updated network slice data, and
selecting, by the wireless station, a default slice identifier for servicing the UE device when the network slice characteristic required by the application does not correspond to one of the slice characteristics of the continuously updated network slice data.

10. The method of claim 9, further comprising:
sending, by the wireless station and to the AMF instance associated with the selected slice identifier, a message to establish a connection between the UE device and the core network.

11. The method of claim 9, wherein each IP address for the AMF instance is associated with a different slice identifier.

12. The method of claim 9, wherein the continuously updated network slice data further includes a particular service level associated with each of the slice identifiers.

13. The method of claim 9, wherein storing the continuously updated network slice data further comprises:
updating the data structure in real time.

14. The method of claim 9, further comprising:
broadcasting, via a downlink broadcast channel, the continuously updated network slice data.

15. The method of claim 9, wherein the continuously updated network slice data includes a change in availability of one of the network slices.

16. The method of claim 9, wherein the wireless station includes a gNodeB for a New Radio access network.

17. Non-transitory, computer-readable storage media storing instructions executable by one or more processors of one or more devices, which when executed cause the one or more devices to:
receive, from a core network device via a first communications interface, continuously updated network slice data for network slices available via the wireless station, wherein the continuously updated network slice data includes:
a slice identifier for each network slice of the network slices,
corresponding slice characteristics for each network slice of the network slices, and
an internet protocol (IP) address for an Access and Mobility Management Function (AMF) instance associated with each of the slice identifiers;
store, in the one or more memories, the continuously updated network slice data for the network slices available via the wireless station to form stored network slice data,
receive, from a user equipment (UE) device via a second communication interface, a registration request message that indicates a network slice characteristic required by an application being executed on the UE device;
determine if there is an available slice in the continuously updated network slice data that corresponds to the network slice characteristic required by the application;
select one of the slice identifiers, from the continuously updated network slice data, for servicing the UE device when the network slice characteristic required by the application corresponds to one of the slice characteristics of the continuously updated network slice data; and
select a default slice identifier for servicing the UE device when the network slice characteristic required by the application does not correspond to one of the slice characteristics of the continuously updated network slice data.

18. The non-transitory, computer-readable storage media of claim 17, further comprising instructions to:
send, to an Access and Mobility Management Function (AMF) instance associated with the selected slice identifier, a message to establish a connection.

19. The non-transitory, computer-readable storage media of claim 17, wherein the continuously updated network slice data further includes a particular service level associated with each of the slice identifiers.

20. The non-transitory, computer-readable storage media of claim 17, further comprising instructions to:
broadcast, via a downlink broadcast channel, the continuously updated network slice data.

* * * * *